(12) United States Patent
Smith et al.

(10) Patent No.: US 10,812,504 B2
(45) Date of Patent: Oct. 20, 2020

(54) SYSTEMS AND METHODS FOR CYBER INTRUSION DETECTION AND PREVENTION

(71) Applicant: RANK SOFTWARE INC., Toronto (CA)

(72) Inventors: Benjamin Smith, Toronto (CA); Mohan Rao, Mississauga (CA); Sylvain Crozon, Toronto (CA); Niranjan Mayya, Mississauga (CA)

(73) Assignee: 1262214 B.C. UNLIMITED LIABILITY COMPANY, Vancouver (CA)

( * ) Notice: Subject to any disclaimer, the term of this patent is extended or adjusted under 35 U.S.C. 154(b) by 149 days.

(21) Appl. No.: 16/120,745

(22) Filed: Sep. 4, 2018

(65) Prior Publication Data
US 2019/0075123 A1   Mar. 7, 2019

Related U.S. Application Data

(60) Provisional application No. 62/554,698, filed on Sep. 6, 2017.

(51) Int. Cl.
*H04L 29/06* (2006.01)
*G06F 21/55* (2013.01)

(52) U.S. Cl.
CPC .......... *H04L 63/1416* (2013.01); *G06F 21/55* (2013.01); *H04L 63/1425* (2013.01); *H04L 63/20* (2013.01)

(58) Field of Classification Search
CPC .................................................. H04L 63/1416
See application file for complete search history.

(56) References Cited

U.S. PATENT DOCUMENTS

| | | | | |
|---|---|---|---|---|
| 6,088,804 A | * | 7/2000 | Hill | G06F 21/552 726/25 |
| 10,158,653 B1 | * | 12/2018 | Magcale | H04L 63/1441 |
| 2013/0304684 A1 | * | 11/2013 | Yufik | G06N 3/0454 706/20 |
| 2016/0269378 A1 | * | 9/2016 | Ye | G06Q 40/06 |
| 2017/0134411 A1 | * | 5/2017 | Ye | H04L 63/1425 |
| 2017/0230398 A1 | * | 8/2017 | Ahmed | G06N 3/0427 |
| 2017/0230399 A1 | * | 8/2017 | Ahmed | G06N 5/041 |
| 2017/0230400 A1 | * | 8/2017 | Ahmed | G06N 3/086 |
| 2017/0230401 A1 | * | 8/2017 | Ahmed | G06N 3/08 |
| 2017/0230407 A1 | * | 8/2017 | Ahmed | G06N 7/005 |
| 2018/0004942 A1 | * | 1/2018 | Martin | G06F 21/554 |
| 2019/0253431 A1 | * | 8/2019 | Atanda | H04L 63/105 |

* cited by examiner

*Primary Examiner* — Bradley W Holder
(74) *Attorney, Agent, or Firm* — Norton Rose Fulbright Canada LLP (57) ABSTRACT

Systems and methods for detecting cyber attacks on a computer network are provided. The system trains attack and detection models. The attack model is used to synthesize network traffic for transmission to a detection model. The detection model is used to make a determination as to whether an attack is occurring. The results of the determination are used as training data for the attack and detection models.

18 Claims, 7 Drawing Sheets

SYSTEMS AND METHODS FOR CYBER INTRUSION DETECTION AND PREVENTION

FIELD

This relates to data protection and cyber security, and in particular to systems and methods for detecting and/or preventing intrusions.

BACKGROUND

Cyber security systems can be broadly classified into two categories—intrusion prevention systems (IPS) and intrusion detection systems (IDS).

IPS systems aim to prevent any data or network breaches, unauthorized data access, and cyber-attacks. Examples of IPS products may include, for example, firewalls, anti-virus software, digital loss prevention (DLP) products, vulnerability and patch management, and the like. Other IDS products may facilitate Penetration Testing, which aims to identify potential security holes that may be ripe for exploitation.

IDS systems aim to detect security breaches, attacks, and data leakages after a potential breach has occurred. Examples of IDS products may include Security Information and event Management Systems (SIEM), and Security Analytics and User Behavior Analytics (UBA).

The prevention of security breaches is challenging. An increasing number of perimeter devices (e.g. smartphones, and other smart devices making use of the Internet of Things (IoT)) on networks increases the surface area available for attack by a malicious actor. Likewise, a malicious actor may only need to breach a single device, whereas an organization must act to protect its entire surface area from attack. Further, some attacks may originate from inside an organization. Moreover, the tools, techniques and procedures used by malicious actors are constantly evolving and may be customized to a particular organization.

IDS systems such as SIEM, Malware Sandboxes, and Security Analytics are signature-based. That is, such systems only detect patterns and/or signatures that researchers have previously seen before and flagged as being malicious or suspicious. Such signatures (sometimes referred to as Indicators of Compromise (IoC)) may be file hashes, malicious URLs or IP addresses, regular expression patterns or even specific sequences of events.

IDS systems which rely on signatures generally do not generate a large amount of false positives. However, systems reliant on signatures generally only detect known or previously observed threats. Moreover, such systems require constant updates as new information is learned. Signature-based systems may not be able to detect previously known (also known as "zero day") attacks.

Other IDS systems may employ rule-based logic, which allows organizations to define complex rule sets to detect threats. Such rules may be tailored to the needs of a specific organization. While rule-based systems may catch potential threats, such systems may also generate a relatively high number of false positives, which may render identifying legitimate threats difficult among the large volume of false positive threat detections. Moreover, rule-based systems may also require frequent updating as new techniques are discovered, and may not detect all unknown threats.

Other IDS systems may employ machine-learning and data science-based models which attempt to discover and flag anomalous behaviour. However, such systems may suffer from a number of drawbacks. For example, the proper training of a machine learning-based model may require the use of specific models to detect specific behaviours, which is subject to the challenges noted above in respect of rules-based systems.

Further, the proper training of a machine-learning based model requires large amounts of training data, which include both positive and negative examples. Such datasets either do not exist or can only be found in small quantities. Moreover, while a model is being tuned, many false positives may be generated. Such systems may also be vulnerable to the use of "poison pill" attacks, where malicious actors generate training data that causes algorithms to treat malicious traffic as benign.

There is a need for cyber security systems which address one or more of the above-noted disadvantages associated with intrusion and detection systems.

SUMMARY

According to one aspect, there is provided a method of detecting cyber attacks in a computer network, the method comprising: training an attack model using a first artificial neural network, the training being based on at least one of an attack database, previous network behavior, and previous network traffic patterns; training a detection model using a second artificial neural network, the training being based on at least one of the previous network behavior and the previous network traffic patterns; synthesizing, by an attack module, an attack vector based on the attack model; transmitting the attack vector to a detection module; determining, by the detection module, whether an attack is taking place; and updating at least one of the attack model and the detection model based on correctness of the determination made by the detection module.

According to another aspect, there is provided a system for detecting cyber attacks on a computer network, the system comprising: a processor; a memory containing computer-readable instructions for execution by said processor, said instructions, when executed by said processor, causing the processor to: train an attack model using a first artificial neural network, the training being based on at least one of an attack database, previous network behavior, and previous network traffic patterns; train a detection model using a second artificial neural network, the training being based on at least one of the previous network behavior and the previous network traffic patterns; synthesize, by an attack module, an attack vector based on the attack model; transmit the attack vector to a detection module; determine, by the detection module, whether an attack is taking place; and update at least one of the attack model and the detection model based on correctness of the determination made by the detection module.

BRIEF DESCRIPTION OF DRAWINGS

In the drawings, which illustrate example embodiments.

DETAILED DESCRIPTION

Figure 1A:
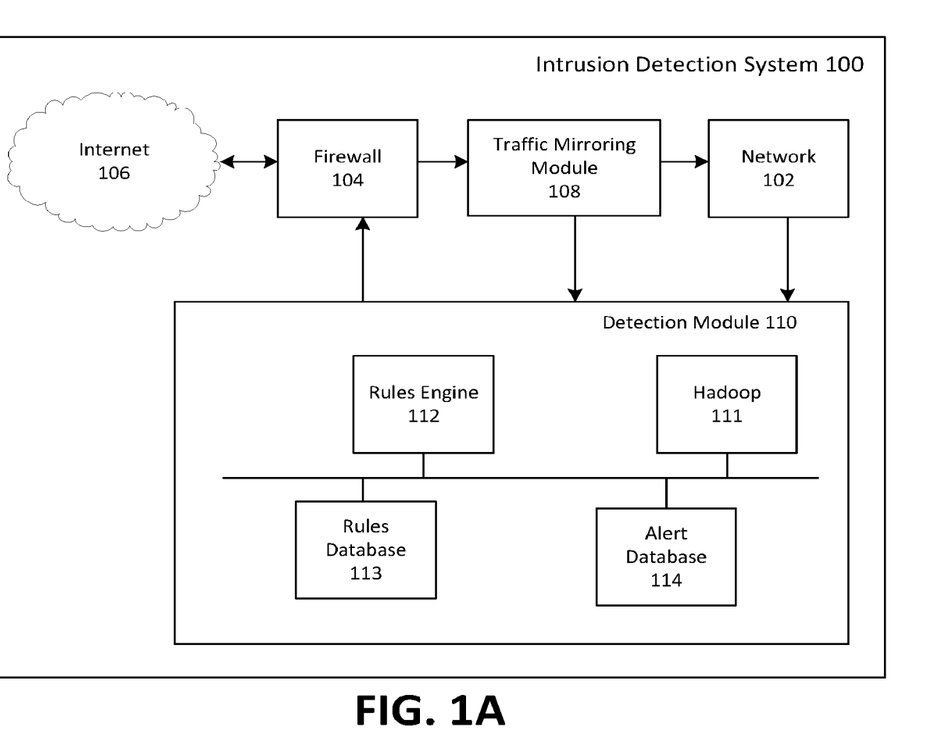
FIG. 1A is a block diagram of an example intrusion detection system.

FIG. 1A is a block diagram of an example intrusion detection system (IDS) 100. As depicted, IDS 100 includes a network 102, a firewall 104 which receives incoming and outgoing network traffic from internet 106 and network 102, respectively, traffic mirroring module 108, and detection module 110.

Figure 1B:
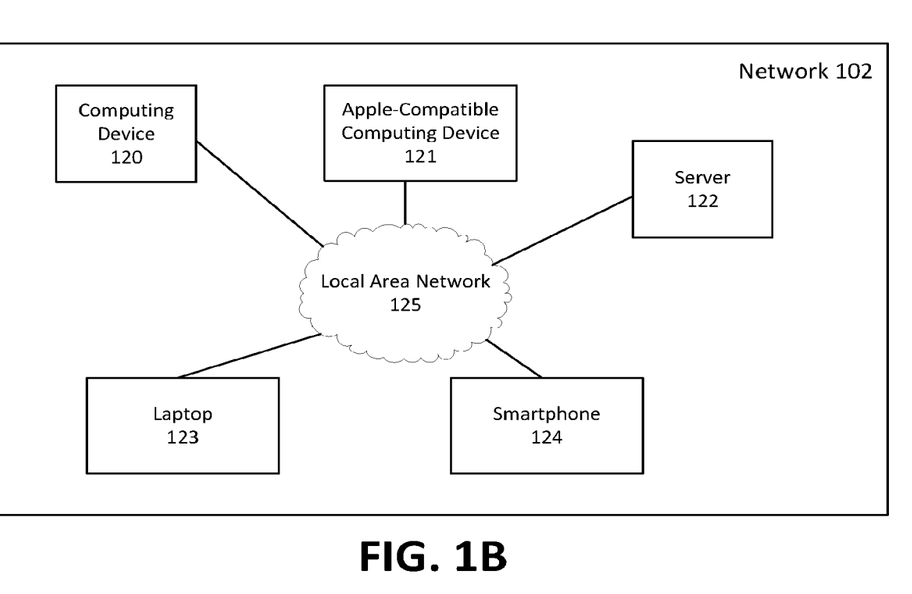
FIG. 1B is a block diagram of an example network, according to some embodiments.

FIG. 1B is a block diagram of an example network 102. In some embodiments, network 102 is an enterprise network. Network 102 includes one or more computing devices. As depicted, network 102 includes computing device 120, Apple-compatible computing device 121, server 122, laptop 123, and smartphone 124. As depicted, each of computing devices 120, 121, 122, 123, 124 is connected to local area network 125. It will be appreciated that various forms of network are contemplated, including both wired and wireless local area networks, wide area networks, Bluetooth, and cellular radios (e.g. LTE, CDMA, GPRS, and the like).

Figure 1C:
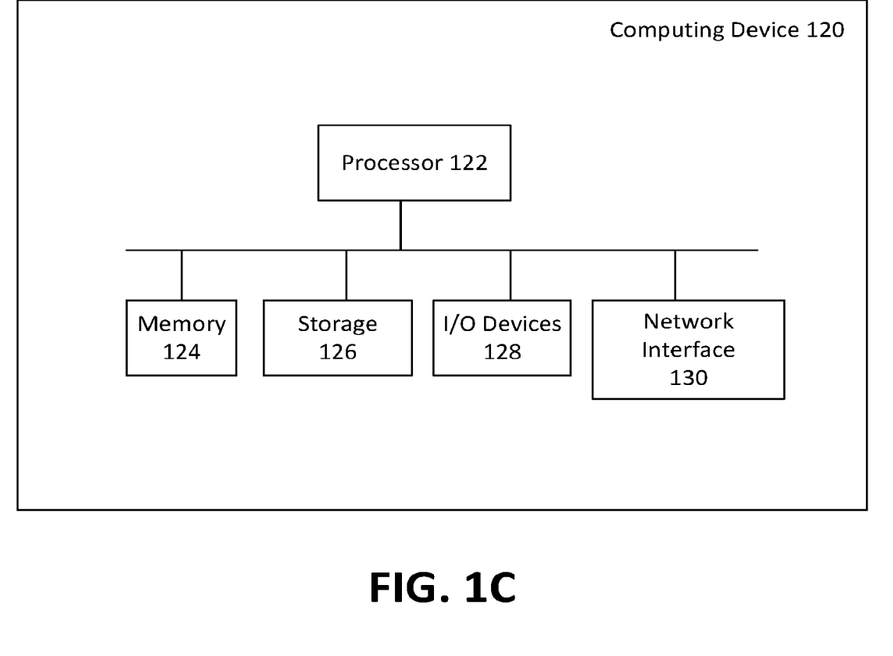
FIG. 1C is a block diagram of an example computing device, according to some embodiments.

FIG. 1C is a block diagram of an example computing device 120. Computing device 120 may include one or more processors 122, memory 124, storage 126, I/O devices 128, and network interface 130, and combinations thereof.

Processor 122 may be any suitable type of processor, such as a processor implementing an ARM or x86 instruction set. In some embodiments, processor 122 is a graphics processing unit (GPU). Memory 124 is any suitable type of random access memory accessible by processor 122. Storage 126 may be, for example, one or more modules of memory, hard drives, or other persistent computer storage devices.

I/O devices 128 include, for example, user interface devices such as a screen including capacity or other touch-sensitive screens capable of displaying rendered images as output and receiving input in the form of touches. In some embodiments, I/O devices 128 additionally or alternatively include one or more of speakers, microphones, sensors such as accelerometers and global positioning system (GPS) receivers, keypads, or the like. In some embodiments, I/O devices 128 include ports for connecting computing device 120 to other computing devices. In an example embodiment, I/O devices 508 include a universal serial bus (USB) controller for connection to peripherals or to host computing devices.

Network interface 130 is capable of connecting computing device 120 to one or more communication networks. In some embodiments, network interface 130 includes one or more or wired interfaces (e.g. wired ethernet) and wireless radios, such as WiFi, Bluetooth, or cellular (e.g. GPRS, GSM, EDGE, CDMA, LTE, or the like). Network interface 130 can also be used to establish virtual network interfaces, such as a Virtual Private Network (VPN).

Computing device 120 operates under control of software programs. Computer-readable instructions are stored in storage 126, and executed by processor 122 in memory 124. Software executing on computing device 120 may include, for example, an operating system.

The systems and methods described herein may be implemented using computing device 500, or a plurality of computing devices 120. Such a plurality may be configured as a network. In some embodiments, processing tasks may be distributed among more than one computing device 120.

Returning to the example embodiment of FIG. 1A, incoming network traffic may be received from internet 106 and passed through firewall 104. The network traffic is then duplicated at traffic mirroring module 108. In some embodiments, the network traffic is raw network data. In some embodiments, the raw network data is obtained using one or more of network taps, span ports, and aggregation switches. In some embodiments, the raw network data may be augmented with application and/or endpoint logs received from applications running within network 102. In some embodiments, logs from cloud-hosted applications (e.g. Dropbox, Office365, or the like) may be sent to the detection module 110 for processing.

Raw network data may be enriched in a number of ways. For example, IP addresses may be mapped to host names, or geolocation may be used with IP addresses external to network 102. The enriched network data may be stored on a database or in a distributed processing system (e.g. Hadoop 111) and sent to a rules engine 112 to detect a violation.

Rules engine 112 may evaluate data against pre-configured rules and signatures in a rules database 113 and create an alert if any rules are violated. Any such alerts may be logged in alert database 114. In some embodiments, the rules are updated by downloading rules and signature databases. Such updates may occur periodically, in accordance with a schedule, or on demand. In some embodiments, one or more of the rules and signature databases is maintained by vendors and/or security analysts The enriched data stored in the distributed data processing system (e.g. Hadoop 111) may be analyzed periodically using custom jobs to create history baselines and to detect anomalies against those baselines. In some embodiments, additional jobs are run to cluster the data and detect anomalies within the clustered data. In further embodiments, enriched data is analyzed using stream analysis systems, such as Spark Streaming (as opposed to a batch analysis using Hadoop 111).

The architecture of IDS 100 in FIG. 1A may have a number of drawbacks. For example, only intrusions defined by previously configured rules and signatures have a good chance at being detected. Moreover, rules database 113 may require constant updates and may become obsolete in the absence of such updates. This may be particularly problematic in instances where outgoing network connections are not available, which is common in production data centres.

IDS 100 detects anomalies based on statistical baselines, which can result in false positives under certain scenarios (e.g. sparse data, brown outs, or the like). Such false positives may require the manual removal from jobs in order to eliminate situations causing false positives.

Figure 2:
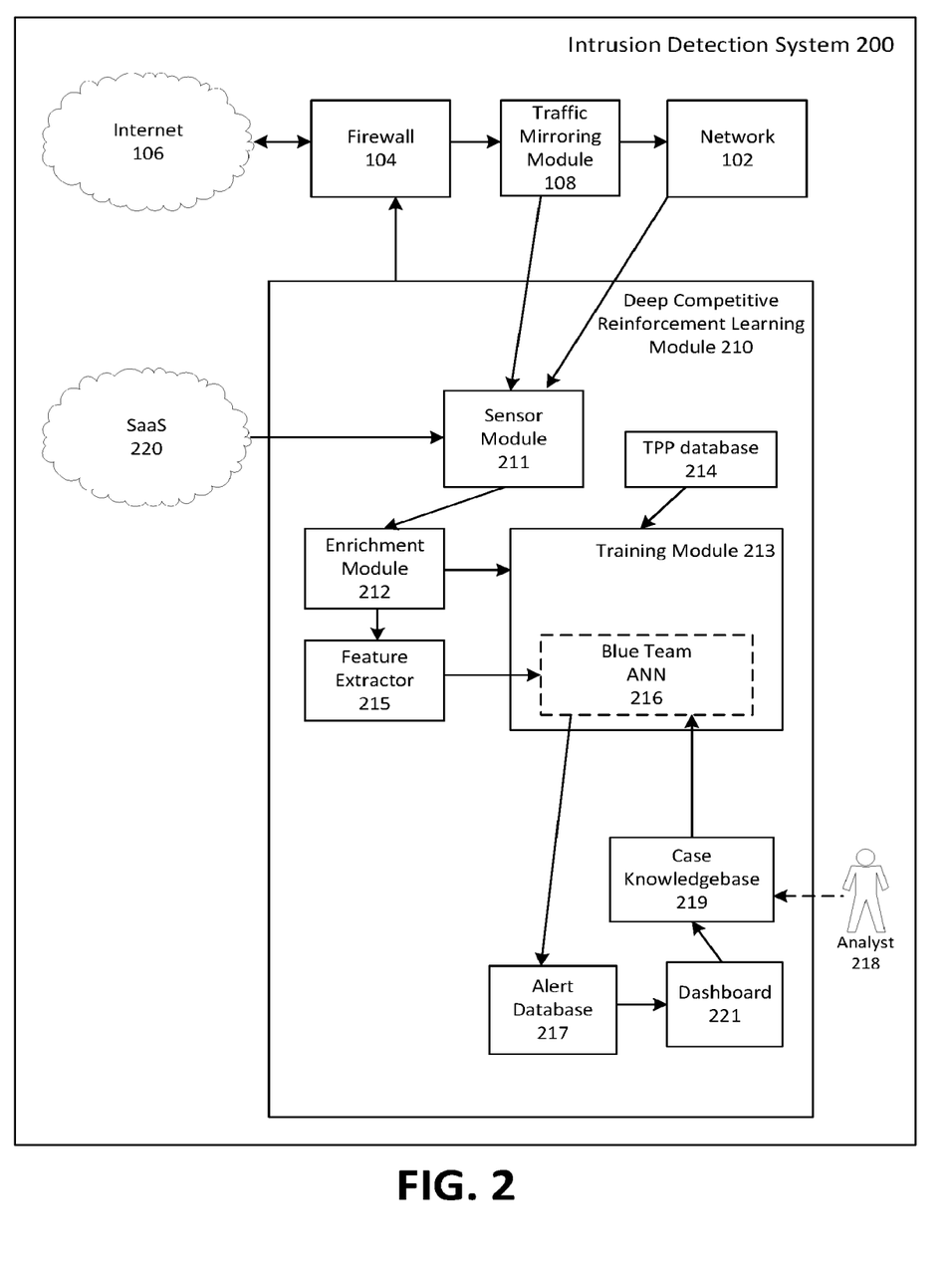
FIG. 2 is a block diagram of an example intrusion detection and prevention system.

FIG. 2 is a block diagram of an example intrusion detection and prevention system 200. As depicted, system 200 includes a network 102, a firewall 104 which receives incoming and outgoing network traffic from internet 106 and network 102, respectively, traffic mirroring module 108, and deep competitive reinforcement learning module 210.

In some embodiments, the system 200 is a Deep Competitive Reinforcement Learning (DCRL) system. DCRL system 200 may combine elements from both intrusion prevention and intrusion detection systems. DCRL system 200 includes an attack module (referred to herein as Red Team), as well as a detection module (referred to herein as Blue Team). In some embodiments, the attack module is configured to attack an organization (e.g. an enterprise network). The detection module is configured to detect activity from the attack module. In some embodiments, the attack module and the detection module compete against one another.

In some embodiments, the attack module and the detection module provide feedback on successful attacks and detections. For example, in the event that the attack module is successful in breaching an organization's network, the attack module provides the detection module with feedback on the success, as well as the attack vector that was used. If the detection module detects an attack in progress, the detection module provides the attack module with feedback on the successful detection, as well as how the attack was successfully detected. The positive and negative reinforcement may allow the attack module to modify attack vectors, and allow the detection module to tune detection mechanisms. In this manner, the attack module may help expose holes or flaws in an organization's security posture that could be exploited by a malicious actor. The detection module may help expose blind spots in an organization's detection mechanisms.

The use of Deep Competitive Reinforcement Learning systems may have numerous benefits associated therewith. For example, the use of signatures (e.g. file hashes, malicious URLs and IP addresses) is not required for attack detection. Moreover, the use of a rules-based system is not required for detection, and thresholds associated with rules do not need to be tuned manually. Instead, rules and thresholds can be learned and tuned actively and iteratively based on feedback between the attack and detection modules. Such tuning may reduce the number of false positive detections by the detection module. DCRL systems may also be useful in environments which might not have an outgoing network connection or intermittent access to an outgoing network connection.

The DCRL system may further alleviate some of the disadvantages associated with prior machine-learning based systems. For example, DCRL systems may be model-free reinforcement learning techniques, and so external data sources might not be required to train the system. Moreover, since the use of supervised learning training data is not strictly required, DCRL systems may be less susceptible to "poison pill" attacks.

DCRL systems may also self-generate training data based on the attack results and detection results provided by the attack module and the detection module.

As depicted in FIG. 2, network traffic from internet 106 is received, passed through firewall 104 and duplicated at traffic mirroring module 108. The duplicated network traffic is then sent to both network 102 and DCRL module 210. As depicted, the network traffic is sent to sensor module 211. In some embodiments, logs from applications running within network 102 and/or application logs from SaaS (software-as-a-service) 220 may also be received at sensor module 211. Raw traffic and application logs may then be enriched at enrichment module 212 in a manner similar to that described above in relation to FIG. 1A.

In some embodiments, the enriched data is sampled and provided to training module 213. Training module 213 is configured to create a historical database used for training models. The training model may utilize knowledge of attacker tools, techniques and procedures (which may be stored in TPP database 214) to create attacks and/or hide said attacks within normal network traffic. The training module may further evaluate the success in detecting such attacks. In some embodiments, the TPP database 214 may require less frequent updating relative to rules database 113 of FIG. 1A because attack tools and procedures in system 200 may evolve at a slower pace.

Newly trained models may be updated and utilized by feature extractor 215 to extract features to provide to Blue team (i.e. the detection module). The features extracted from the trained model are used as an input by Blue Team Artificial Neural Network (ANN) 216. Blue Team ANN 216 utilizes the trained model to detect malicious behavior and intrusions. In some embodiments, Blue Team ANN 216 raises an alert when an activity deemed suspicious is detected. As depicted, alerts are stored in alert database 217.

In some embodiments, Blue Team ANN 216 may receive feedback and reinforcement based on previously actioned cases. In some embodiments, one or more analysts 218 may review and action alerts from alert database 217. In some embodiments, the analyst 218 accesses the alert database via dashboard 221. The analyst may conclude that an alert is a false positive, or may conclude that the alert was legitimate. The analyst actions may be recorded in case knowledgebase 219, and may be used as reinforcement by the Blue Team ANN 216. Such reinforcement may improve detection and/or may reduce the amount of false positive alerts raised by system 200.

In some embodiments, the architecture of system 200 may overcome one or more of the drawbacks associated with rules-based and anomaly-based detection models. System 200 might not require rules or signatures to be defined in order to detect intrusion. Moreover, system 200 might not require an outgoing internet connection to function.

In some embodiments, system 200 does not rely on statistical baselines. System 200 may assume that most or all traffic in an organization is normal traffic, and then attempt to hide attacks in a quasi-real representation of normal traffic. Moreover, the models used by system 200 can self-evolve as an organization's network traffic patterns change. Further, in some embodiments, manual updating of jobs and attack strategies might not be required, because past feedback from analyst 218 is represented in case knowledgebase 219, which is utilized by Blue Team ANN 216 to improve detection and reduce false positives.

Figure 3:
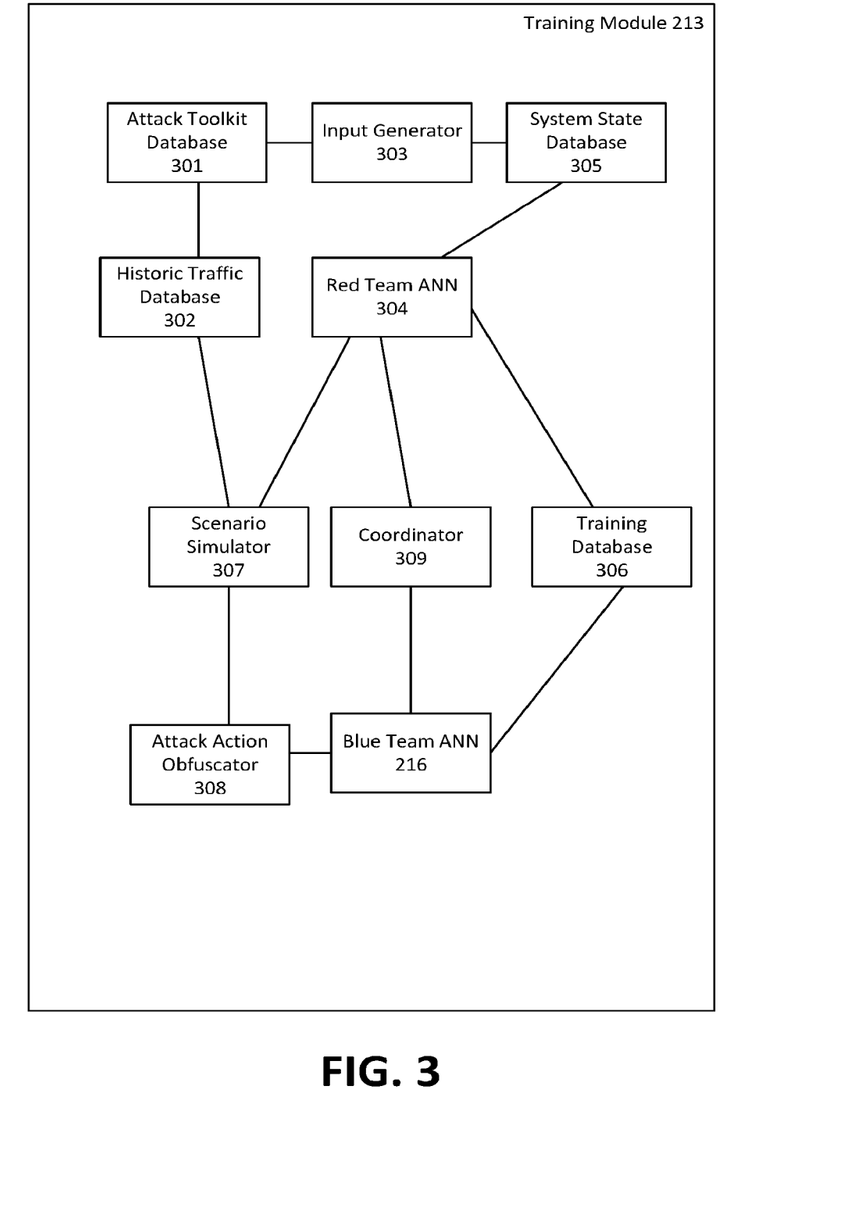
FIG. 3 is a block diagram of an example embodiment of the training module depicted in FIG. 2.

FIG. 3 is a block diagram of an example embodiment of training module 213. As depicted, training module 213 includes attack toolkit database 301, historic traffic database 302, input generator 303, system state database 305, Red Team Artificial Neural Network (ANN) 304, training database 306, scenario simulator 307, attack action obfuscator 308, Blue Team ANN 216, and coordinator 309.

Attack toolkit database 301 is used during training by Red Team ANN 304. Attack toolkit database 301 includes a set of definitions for each valid attack type that can be executed by Red Team ANN 301. In some embodiments, each attack definition comprises a) an attack identifier and an impact associated with the attack. The attack identifier may be encoded as a vector, and can be used by Red Team ANN 301 to reference an attack. The impact associated with the attack is used to update the system state database 305 and create realistic traffic patterns.

System state database 305 may be an in-memory object database. System state database 305 may be queried to provide input vectors to Red Team ANN 304. System state database 305 may also be used to provide an up-to-date system state to scenario simulator 307 for the creation of traffic scenarios.

In some embodiments, input generator 303 queries attack toolkit database 301 and system state database 305. The results of this query are processed to create the vectors used by Red Team ANN 304. Scenario simulator 307 is configured to examine the historic traffic database 302 for the network 102 and create a traffic scenario. Historic traffic database 302 stores historical network traffic data associated with network 102. In some embodiments, historical network traffic data is stored in compressed parquet files. During training, the compressed parquet files may be queried (for example, using Apache Spark), aggregated into time-series that describe traffic patterns, and used by scenario simulator 307 to synthesize realistic training patterns.

In one example, an example traffic scenario includes activities of various users throughout a day. Some users may arrive at 9 am and leave at 5 pm, whereas other users may arrive at 8 am and leave at 6 pm. The network traffic would reflect the activities of these users at various times throughout the day. Synthetic traffic patterns may be created by sampling from historic activity profiles and using various combinations of previously observed network behavior.

Scenario simulator 307 is used during the training of Red Team ANN 304 and Blue Team ANN 216. In some embodiments, scenario simulator 307 is configured to generate a snapshot of the current state of network 102. In some embodiments, the snapshot of the current state of the network is based on one or more of historical traffic patterns, an internal model of the system state (e.g. time, the number of hosts in network 102, the host configuration(s), the current date and time of the simulation, or the like), as well as the current Red Team ANN 304 action. In some embodiments, simulator 307 is implemented as a single in-memory process. Scenario simulator 307 is further configured to accept the current Red Team ANN 304 action as an input in the form of an encoded vector.

Attack action obfuscator 308 is configured to hide or conceal the action selected by the Red Team ANN 304 in the traffic scenario created by scenario simulator 307. Attack action obfuscator 308 may also create input vectors as inputs for Blue Team ANN 216. Red Team ANN 304 is further operable to update the system state database 305 based on the selected attack. Coordinator 309 is operable to manage the output from Blue Team ANN 216 and Red Team ANN 304. In some embodiments, coordinator 309 determines whether networks should be re-trained, whether scenarios should be reset, and tracks convergence. Once scores and rewards have been computed for Blue Team ANN 216 and Red Team ANN 304, the scores and associated training information may be recorded in training database 306.

Training database 306 is used during training of the Read Team ANN and Blue Team ANN to indicate the historical outcome of the taking of specific actions in particular scenarios. In some embodiments, training database 306 stores a snapshot of the system state, the action taken by the Red Team ANN 304 and/or Blue Team ANN 216, and the outcome (e.g. whether the Blue Team ANN 216 took the correct action). In some embodiments, training database 306 is an in-memory object database.

In some embodiments, both the Blue Team ANN 216 and Red Team ANN 304 are implemented as recursive neural networks (RNNs). The RNNs may have long-short-term-memory (LSTM) using, for example, a Tensorflow framework running in independent processes. Such a configuration may allow the Blue and Red Team ANNs to model long term temporal dependencies between observations.

In some embodiments, both the Blue Team ANN 216 and Red Team ANN 304 require an input vector describing the observed system state (i.e. current network traffic). The Blue Team ANN 216 might not require any further input beyond the current network traffic. In some embodiments, the Red Team ANN 304 may further receive the known state of the system, which may include a listing of which hosts have been successfully compromised, as well as any additional information gleaned during an attack (e.g. the operating system running on a particular host, or the like).

In some embodiments, the Blue Team ANN 216 may output a vector encoding the identity of a host believed to be executing an attack, or a flag indicating that no attack is believed to be in progress. In some embodiments, the Blue Team ANN 216 outputs a probability that an attack is in progress.

In some embodiments, the Red Team ANN 304 may output one or more of a vector encoding the identifier of an attack to execute, parameters associated with the attack, or a flag indicating that no attack is being executed.

Figure 4:
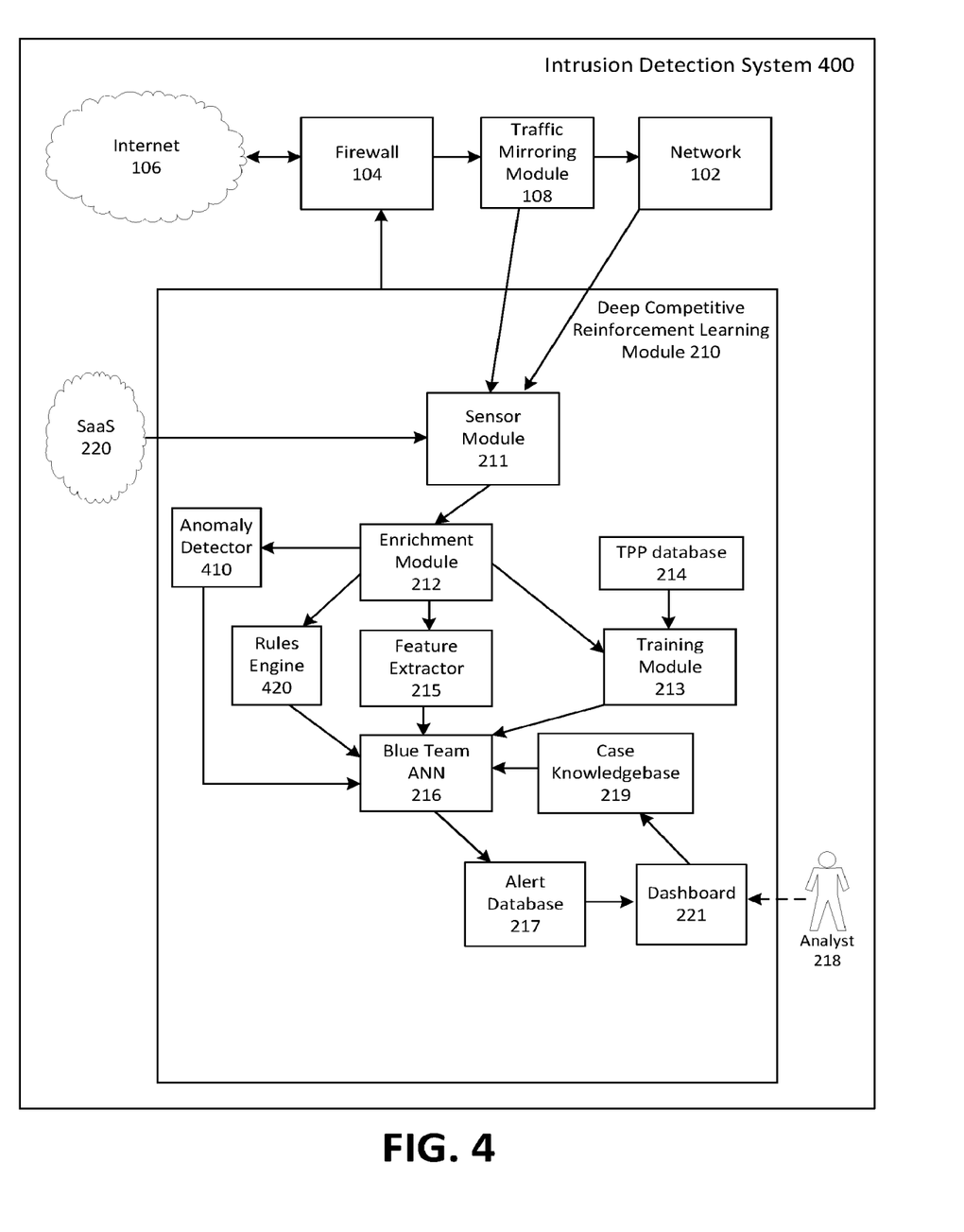
FIG. 4 is a block diagram of components in an example intrusion detection system.

In some embodiments, system 200 may have difficulty in detecting intrusions until sufficient training data has been received to train the model (a so-called "cold start"). FIG. 4 is a block diagram of components in an example intrusion detection system 400. System 400 may be augmented to perform rules-based detection to detect known threats. As depicted, enriched network data is sent to anomaly detector 410 and rules engine 420. Any alerts generated by rules engine 420 and anomaly detector 410 may be sent to and analyzed by Blue Team ANN 216, which may reduce false positives. The remaining components in system 400 may function in a manner similar to system 200 described above. Although FIG. 4 depicts Blue Team ANN 216 separately from training module 213, it should be appreciated that in some embodiments, training module 213 includes Blue Team ANN 216 (e.g. as in FIG. 2).

Systems 200 and 400 may be configured to perform attack/defense cycles. According to one example, the attack toolkit database 301 includes one or more of the following operations: 1) Noop (Red team does not conduct an attack), 2) Scan (Red team conducts a scan of a specific device in network 102 to assess potential vulnerabilities), and 3) Attack (Red team attacks a device based on available vulnerabilities. In some embodiments, the Scan operation may be performed by, for example, the nmap utility. In one example, determining that a particular device is a computer running Windows may allow the Red Team to utilize a "pass the hash" attack. The attack toolkit database 301 may be updated over time based on new TPPs used by attackers.

Continuing with the example, the system state for the Red Team may include: 1) a time-series graph that indicates bandwidth usage over time between various devices in network 102, 2) a time series graph that indicates connectivity over time between various devices in network 102, and 3) a set of already-discovered devices, and the devices' associated properties and vulnerabilities. The system state of the Red Team may be stored in system state database 305.

In some embodiments, the Red Team and the Blue Team are implemented using backpropagating artificial neural networks (ANNs). An ANN may be implemented using, for example, the TensorFlow software package. One or more of the Red Team and the Blue Team may create and maintain a database of training examples (e.g. training database 306). In some embodiments, training database 306 is implemented using a low-latency cache lookup (e.g. Redis).

An example attack/defend cycle may begin with the Red Team ANN 304 receiving a vectorized system state as an input. Based on the training from past data, the Red Team ANN 304 then picks an action from the attack toolkit database 301. In some embodiments, the actions may include one or more of doing nothing, scanning, and attacking a discovered device. In some embodiments, if no training data is available, the operation may be chosen randomly from the attack toolkit database 301.

In some embodiments, the output from the Red Team ANN 304 is an encoded set of actions, together with a probability associated with each action. The attack action obfuscator then combined the selected action with the simulation of network traffic provided by scenario simulator 307. The Blue Team ANN 216 then receives vectorized events from attack action obfuscator 308. It should be understood that the Red Team actions are hidden within the vectorized events. The Blue Team ANN 216 then outputs a probability of an observed attack in the simulated traffic.

In some embodiments, rewards are calculated for each of the Red Team and the Blue Team. The reward function may be a mathematical formula based on the output of the Red Team and the Blue Team ANNs. An example function may accept the output of each of the Red Team and Blue Team as inputs. The function may return a value for each of the Red Team and Blue Team. In some embodiments, the outputs are inverted for each of the Red and Blue Teams. For example, if the Red Team input is "attack" and the Blue Team input is "detected", then there was a successful detection by the Blue Team and an unsuccessful attack by the Red Team. In this example, Red Team would receive (−1) points, and Blue Team would receive (+1) points.

As another example, if the Red Team input is "attack" and the Blue Team input is "not detected", then the attack is successful and Read Team receives (+1) and Blue Team receives (−1). If the Red Team input is "no attack" and Blue Team input is "detected", this is a false positive and Red Team receives (+1) and Blue Team receives (−1). If the Red Team input is "no attack" and Blue Team input is "not detected", then this is a successful diagnosis by Blue Team, and Red Team receives (−1) and Blue Team receives (+1).

After rewards are assigned, both the Red Team and the Blue Team update training database 306 with the details of the example scenario and their corresponding rewards as the output.

As described herein, a scenario is a collection of iterations of attack/defend cycles. The cumulative reward score for the Red Team and the Blue Team is computed for each scenario. A scenario may be a fixed set of iterations (e.g. 50 attack/defend cycles). A scenario may also indicate a victory for the Red Team or the Blue Team (e.g., Blue Team wins if the Red Team is detected before the Red Team has made a successful attack).

In some embodiments, the system state is reset after each scenario. The above-noted series of actions may be repeated. In one example, after generating 100 (or more) training examples, the Red Team and the Blue Team ANNs may be re-trained based on the generated examples to adjust the weights in one or more ANNs. In some embodiments, convergence may occur when the cumulative reward scores for scenarios reach an equilibrium point.

Figure 5:
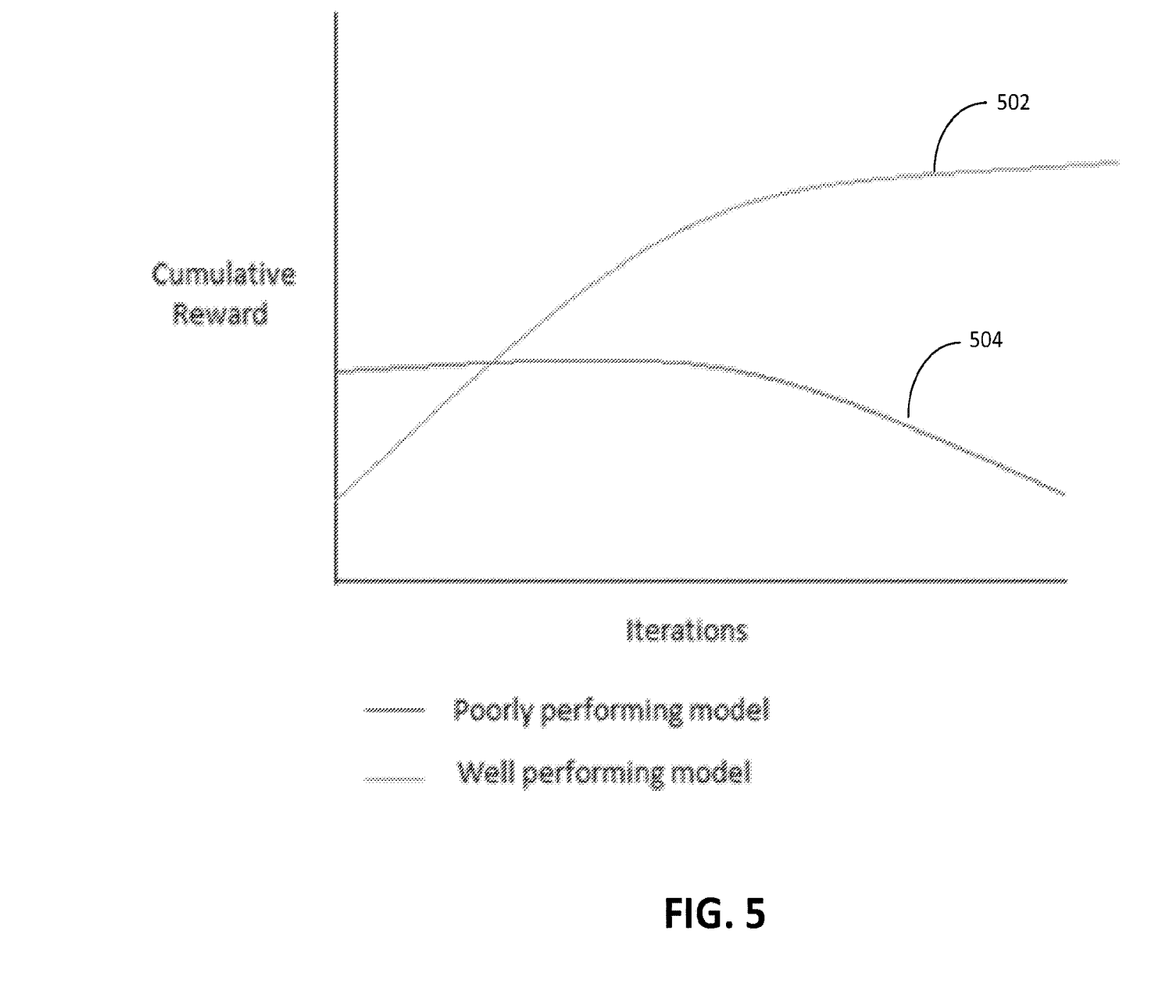
FIG. 5 is an illustration of an example time-series graph tracking the cumulative score for the Red Team and the Blue Team over time for a given scenario.

FIG. 5 is an illustration of an example time-series graph tracking the cumulative rewards for the Red Team and the Blue Team over time for a given scenario. As depicted in FIG. 5, an improving model 502 will show an increasing cumulative score. A poorly performing model 504 will show a decreasing cumulative score.

Figure 6:
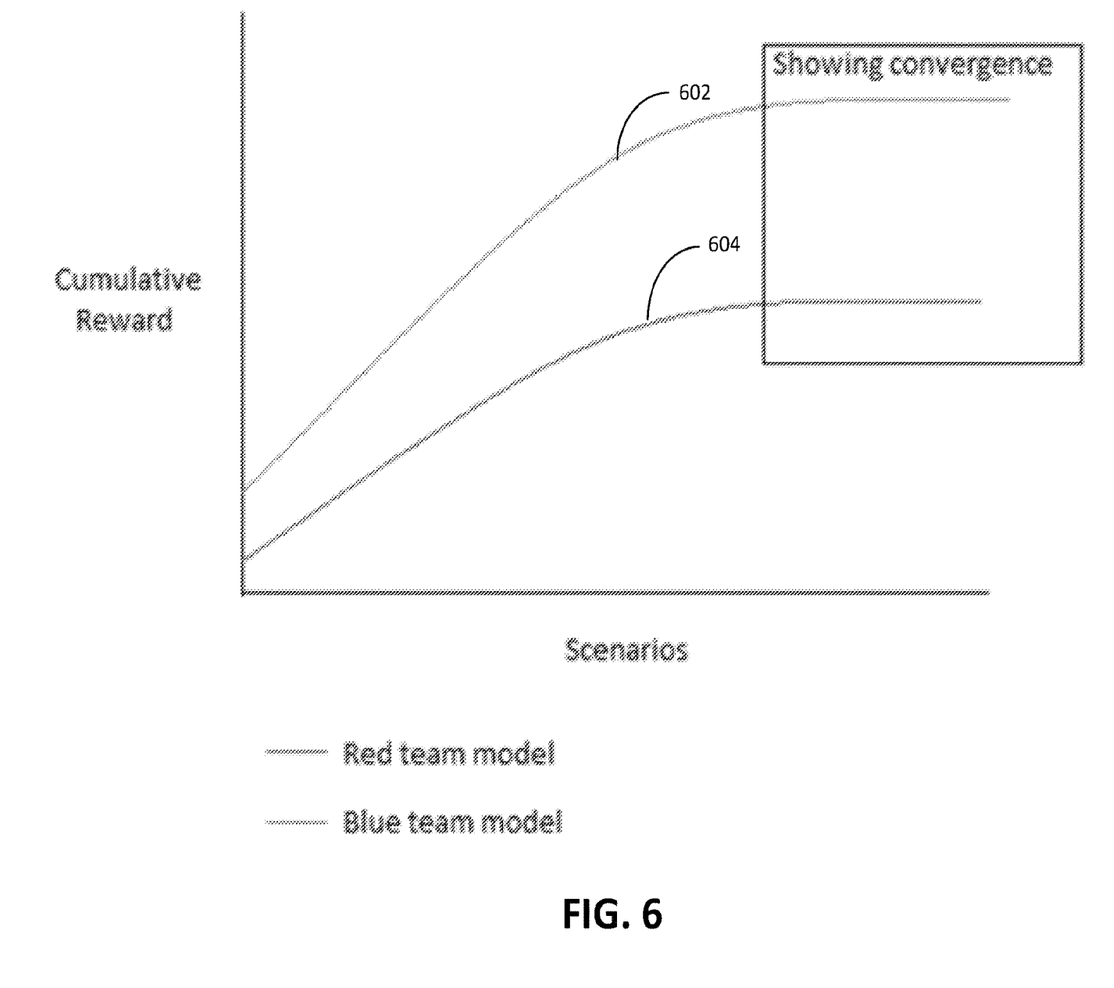
FIG. 6 is an illustration of an example time-series graph showing the scores for each of the Red Team and the Blue Team over time for a given scenario.

FIG. 6 is an illustration of an example time-series graph showing the scores for each of the Red Team and the Blue Team over time for a given scenario. As depicted, the cumulative score for the Blue Team 602 and for the Red Team 604 begin to reach equilibrium as the number of scenarios increases.

Various aspects of the invention will be described with reference to hypothetical use cases intended to highlight the behavior of embodiments of the present systems relative to the behavior of conventional detection systems. In the hypothetical cases, a first company, Classic Inc., installs a conventional intrusion detection system, and a second company, Deep Inc., employs a detection system incorporating one or more aspects of deep competitive reinforcement learning.

During initial setup, Classic Inc. configures and customizes its rule set for Classic Inc.'s unique network needs and known attacks. Classic Inc. continues to adjust the rules database for several weeks in order to reach a manageable balance between legitimate alerts and false positives raised by the conventional detection system.

During initial setup, Deep Inc. provides a month's worth of historical network traffic data. The system 200 self-trains Red Team ANN 304 and Blue Team ANN 216 components over the course of a day. In some embodiments, the system 200 may be ready for use after less than a day of training.

After several months of operation, a new attack toolkit is released. The security departments at Classic Inc. and Deep Inc. both take measures in an effort to ensure new attacks can be detected by their respective security systems.

Using a conventional system, Classic Inc. would begin by researching the indicators of compromise for the new attack toolkit and develop rules to integrate within their detection system. The new rules would be deployed, and then refined until an acceptable level of false positive results is attained. By contrast, Deep Inc. would update the attack toolkit database 301 with the new attack definition. The system 200 would then re-train models incorporating the new attack type in the possible attack combinations. In some embodiments, system 200 would be ready for use in less than a day. It is clear that in such a scenario, the system 200 is able to adapt to new attack definitions in a more responsive way than conventional systems, and in a manner that requires less active effort for security departments.

In another example, Classic Inc. and Deep Inc. become concerned about after-hours activities by employees and wish to ensure that any suspicious activities are caught. Using conventional techniques, Classic Inc. would review its detection rules, notice after-hours activities are not being detected, and then begin tweaking various parameters to increase the sensitivity of the system. Such modifications may result in increased false positives during business hours (whereas detection of after-hours activities is the issue). Ultimately, it would be determined that different threshold parameters are required for different times of day, and a more complex rules configuration would be created by the security department at Classic Inc.

Contrastingly, faced with the same problem, system 200 at Deep Inc. would already have such a use case already covered. System 200, and in particular training module 213, learns and adapts to different traffic patterns at different times of day. An aberration in network traffic outside of business hours would be recognized as abnormal and an alert would be raised. Such a use case would require relatively little effort on the part of Deep Inc. to account for, whereas Classic Inc. would be required to expend significant resources in diagnosing and correcting the issue.

In another example, it may become known that certain network scanning activities are an early warning sign of an attacker. Classic Inc. would review their detection configuration, and ensure that scanning activity is included in the rules. Contrastingly, system 200 at Deep Inc. would already have adapted to detecting scanning activity, and using the detection of scanning activity as evidence of a possible attack, even if scanning is insufficient to trigger an alert on its own.

In another example, Classic Inc. and Deep Inc. decide, as part of their yearly security posture assessment, to perform a simulation of an attack. Classic Inc. would have to hire an external consultant, provide the consultant with access to their network to perform penetration tests, review the results, and address new security vulnerabilities. This represents a significant effort and cost expenditure. Contrastingly, Deep Inc.'s deep competitive reinforcement learning system would already be performing such tests on a regular basis using Red Team ANN 304 and Blue Team ANN 216. As such, the exercise would be automated and would constitute little more than a minor, regular task.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods, or steps.

As can be understood, the detailed embodiments described above and illustrated are intended to be examples only. Variations, alternative configurations, alternative components and modifications may be made to these example embodiments. The invention is defined by the claims.

What is claimed is:

1. A method of detecting cyber attacks in a computer network, the method comprising:
   training an attack model using a first artificial neural network, said training said attack model being based on at least one of an attack database, previous network behavior, and previous network traffic patterns;
   training a detection model using a second artificial neural network, said training said detection model being based on at least one of the previous network behavior and the previous network traffic patterns;
   synthesizing, by an attack module, an attack vector based on the attack model;
   transmitting the attack vector to a detection module;
   determining, by the detection module, whether an attack is taking place;
   updating at least one of the attack model and the detection model based on correctness of the determination made by the detection module; and
   responsive to the determination of the detection module being correct, incrementing a detection model score.

2. The method of claim 1, further comprising:
   receiving network traffic at the detection module; and
   outputting, by the detection module, an output vector based on the received network traffic.

3. The method of claim 2, wherein the output vector indicates that an attack is taking place.

4. The method of claim 3, wherein the output vector comprises an identity of a host executing an attack.

5. The method of claim 2, wherein the output vector comprises a flag indicating the absence of an attack.

6. The method of claim 2, further comprising:
   receiving, at the detection module, application logs from at least one of an application running in the computer network and an application running in a distributed computing system.

7. The method of claim 1, further comprising:
   responsive to the determination of the detection module being incorrect, incrementing an attack model score.

8. The method of claim 7, further comprising decrementing the detection model score.

9. The method of claim 1, further comprising decrementing an attack model score.

10. A system for detecting cyber attacks on a computer network, the system comprising:
    a processor;
    a memory containing computer-readable instructions for execution by said processor, said instructions, when executed by said processor, causing the processor to:
    train an attack model using a first artificial neural network, said training said attack model being based on at least one of an attack database, previous network behavior, and previous network traffic patterns;
    train a detection model using a second artificial neural network, said training said detection model being based on at least one of the previous network behavior and the previous network traffic patterns;
    synthesize, by an attack module, an attack vector based on the attack model;
    transmit the attack vector to a detection module;
    determine, by the detection module, whether an attack is taking place;
    update at least one of the attack model and the detection model based on correctness of the determination made by the detection module; and
    responsive to the determination of the detection module being correct, incrementing a detection model score.

11. The system of claim 10, wherein the instructions further cause the processor to:
    receive network traffic at the detection module; and
    output, by the detection module, an output vector based on the received network traffic.

12. The system of claim 11, wherein the output vector indicates that an attack is taking place.

13. The system of claim 12, wherein the output vector comprises an identity of a host executing an attack.

14. The system of claim 11, wherein the output vector comprises a flag indicating the absence of an attack.

15. The system of claim 11, wherein the instructions further cause the processor to:
    receive, at the detection module, application logs from at least one of an application running in the computer network and an application running in a distributed computing system.

16. The system of claim 10, wherein the instructions further cause the processor to:
    responsive to the determination of the detection module being incorrect, incrementing an attack model score.

17. The system of claim 16, wherein the instructions further cause the processor to decrement the detection model score.

18. The system of claim 10, wherein the instructions further cause the processor to decrement an attack model score.

* * * * *